United States Patent [19]

Schell et al.

[11] Patent Number: 4,971,646

[45] Date of Patent: Nov. 20, 1990

[54] METHOD FOR FORMING A HOLOGRAM FILM LAMINATE AND THE HOLOGRAM LAMINATED PRODUCT FORMED THEREBY

[76] Inventors: Russell W. Schell, 4612 Gregory St., McHenry, Ill. 60050; Anthony R. Losacco, 1025 E. Maple St., Lombard, Ill. 60148

[21] Appl. No.: 326,889

[22] Filed: Mar. 21, 1989

[51] Int. Cl.5 .............................................. B32B 31/12
[52] U.S. Cl. .................................. 156/244.17; 40/626; 156/244.22; 156/272.6; 156/277; 156/324; 235/380; 235/488; 264/1.3; 283/86; 283/109; 350/3.61; 428/213; 428/458; 428/916
[58] Field of Search ................ 40/626; 156/269, 272.6, 156/272.8, 277, 324, 244.17, 244.22; 235/380, 457, 488; 264/1.3; 283/86, 107, 109, 904; 350/3.61; 428/213, 343, 345, 458, 916; 430/1, 2, 10, 13

[56] References Cited

U.S. PATENT DOCUMENTS

| | | | |
|---|---|---|---|
| 4,014,602 | 3/1977 | Ruell | 350/3.5 |
| 4,121,003 | 10/1978 | Williams | 428/40 |
| 4,171,864 | 10/1979 | Jung et al. | 350/3.61 |
| 4,381,329 | 4/1983 | Dallmann et al. | 428/204 |
| 4,456,667 | 6/1984 | Bochow et al. | 430/10 |
| 4,519,155 | 5/1985 | Gallagher et al. | 40/625 |
| 4,592,976 | 6/1986 | Whitehead | 430/10 |
| 4,684,795 | 4/1987 | Colgate, Jr. | 235/457 |
| 4,754,128 | 6/1988 | Takeda et al. | 235/488 |
| 4,789,211 | 12/1988 | Wreede | 350/3.61 |
| 4,838,965 | 6/1989 | Bussard | 156/277 X |

Primary Examiner—Robert A. Dawson
Attorney, Agent, or Firm—Thomas R. Vigil

[57] ABSTRACT

The method for creating a hologram film laminated product comprises the steps of: applying a thermoplastic adhesive material to one side of a hologram film; feeding a substrate to a heat activated dry film thermo laminator and simultaneously feeding the hologram film with the thermoplastic adhesive coated side thereof facing the substrate into the laminator with the substrate; and heat activated dry film thermo laminating the hologram film material to the substrate. The method for applying an adhesive to a hologram film includes the steps of: passing the hologram film between electrical corona treatment rollers; then passing the hologram film past a priming or sizing station; and next passing the hologram film past an adhesive applicator for applying melted adhesive to the hologram film. The hologram laminated product formed by the methods includes a substrate layer, an intermediate adhesive layer, and a hologram film layer.

52 Claims, 7 Drawing Sheets

METHOD FOR FORMING A HOLOGRAM FILM LAMINATE AND THE HOLOGRAM LAMINATED PRODUCT FORMED THEREBY

BACKGROUND OF THE INVENTION

1. Field of the Invention

The present invention relates to a method or process for forming a hologram laminate product and more specifically a hologram laminate where the layer of hologram material extends completely across one side surface of the laminated product which can be an identification card or credit card.

2. Description of the Prior Art

Heretofore pieces of hologram material have been pressed, stamped or adhered by an adhesive onto the top plastic surface of a credit card.

It has now become desirable to provide a hologram product wherein one laminate, layer, or sheet of the laminated product is hologram film material which extends the full surface area of at least one side of the laminated product.

Heretofore attempts to provide a satisfactory laminated product, such as a credit card, having, as one laminate, a sheet of hologram material, have not been successful.

As will be described in greater detail hereinafter, the method of the present invention enables one to make a laminated product wherein one sheet, layer, or laminate of the laminated product is a sheet of hologram material and the product formed by the method, such as a credit card, has a sheet of hologram material extending the full surface area of the laminated credit card.

SUMMARY OF THE INVENTION

According to the invention there is provided a laminated hologram product including a stiff, but flexible substrate layer, a hologram layer and an intermediate thermoplastic adhesive layer which is initially applied as an extruded hot melt to one side of said hologram layer and then allowed to dry, said laminated hologram product being formed by feeding the hologram layer with the thermoplastic adhesive layer thereon together with the substrate layer through a heat activated dry film thermo laminator.

Further according to the invention there is provided a method for creating a hologram film laminated product comprising the steps of: treating one side surface of a hologram film for enhancing the adherence of an adhesive material thereto; extruding a hot melt of thermoplastic adhesive material onto said one side surface of the hologram film and allowing the thermoplastic adhesive material to dry; feeding a substrate to a heat activated dry film thermo laminator; simultaneously feeding the hologram film with the thermoplastic adhesive coated side thereof facing the substrate into the laminator with the substrate; and thermolaminating the hologram film material to the substrate.

DESCRIPTION OF THE PREFERRED EMBODIMENTS

Figure 1:
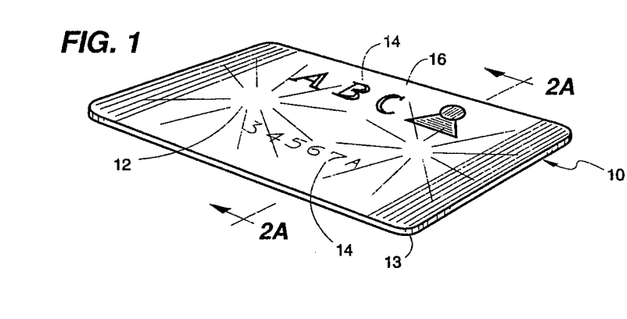
FIG. 1 is perspective view of a laminated product, such as a laminated credit card, constructed according to the teachings of the present invention and including, as one layer thereof, a sheet of hologram film.

Referring now to the drawings in greater detail, FIG. 1 is a perspective view of a hologram laminated product 10 including a sheet, layer, or laminate of hologram film or film material 12 which extends throughout at least one side surface area of the laminated product 10 and is fixed to a substrate 13. The laminated product 10 is shown as a credit card 10 having printing 14 on top of the hologram material 12 and is coated with a film of clear plastic protective material 16 (FIG. 2A).

Figure 2A:
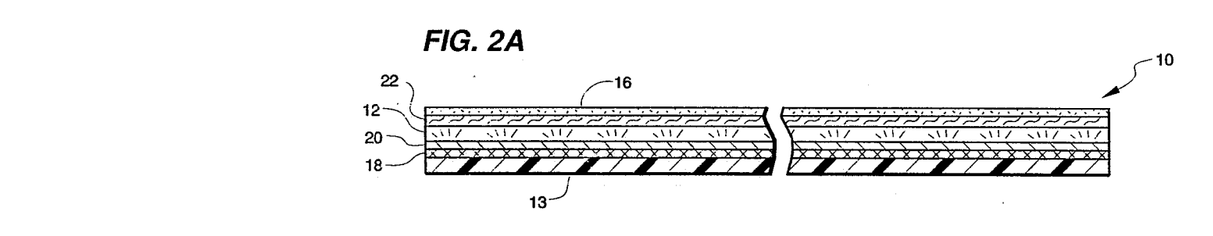
FIG. 2A is a sectional view through the laminated product as shown in FIG. 1 and is taken along line 2A—2A of FIG. 1.

FIG. 2A is an enlarged fragmentary sectional view through the credit card shown in FIG. 1 and is taken along lines 2A—2A of FIG. 1. In this Figure, some of the laminated layers or laminates of the credit card are not drawn to scale and are drawn larger than scale to illustrate the layers of the laminated product or credit card 10.

The bottom layer 13 is a substrate typically made of a thermoplastic material. The second layer 18 is thermoplastic adhesive. The third layer 20 represents a metalized coating 20 o the hologram 12. The fourth layer 12 is the hologram film. The fifth layer 22 represents printing on the outer side of the hologram film material 12. The sixth or top layer 16 is a protective layer of clear film or coating.

Figure 2B:
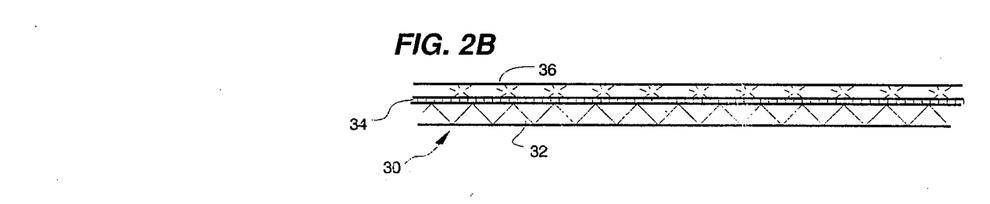
FIG. 2B is a fragmentary sectional view of a laminated product, similar to the view shown in FIG. 2A but showing the cross-section of the laminated product in its simplest form.

In its simplest form, a hologram laminated product 30 constructed according to the teachings of the present invention comprises a substrate 32, a layer of thermal adhesive 34 and a layer of hologram film 36 is shown in FIG. 2B.

Hologram material 12 is manufactured by several sources and is typically manufactured on a polyester or similar flexible plastic material. One can specify thickness of the material and the size of the roll in terms of length and width, the tension, the coating side and the laminate repeats of the hologram. Present technology allows one to obtain a roll or web of hologram film material that has a width of 25 inches and a length determined by the size of the roll one wishes to purchase.

Hologram film 36 or 12 can be obtained in a roll metalized or unmetalized. Depending upon the needs of the ultimate consumer, the hologram film 36 can be metalized or unmetalized. In one preferred embodiment of the laminated product 10 made by the method or process of the present invention, the sheet of hologram film 12 is metalized and in another preferred embodiment of the laminated product 30 the hologram film 36 is unmetalized.

Typically the length of the hologram film on a slit roll for commercial distribution is between 1,500 and 3,000 feet in length.

The hologram film typically has a thickness of ½ to 4 mils, or heavier.

Figure 3:
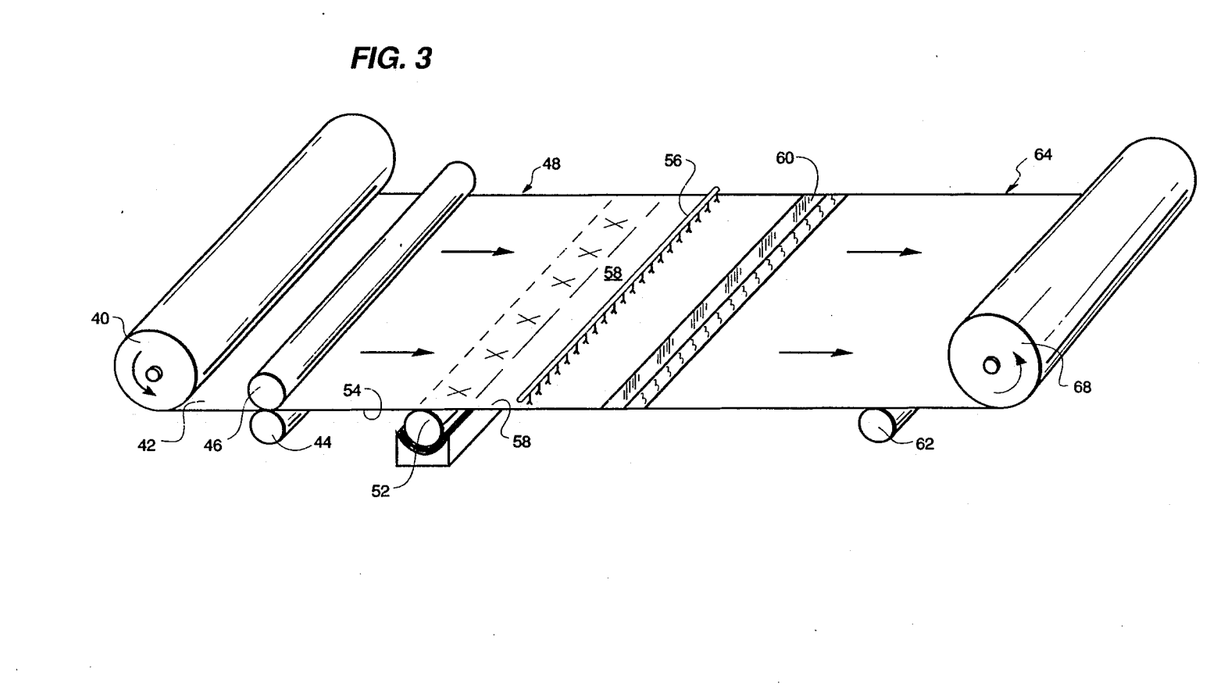
FIG. 3 is a fragmentary perspective view of an apparatus for applying adhesive to one side of a roll of hologram film material.

According to the teachings of the present invention, and as illustrated in FIG. 3, a roll 40 of metalized hologram film material 42 is coated with a thermoplastic adhesive layer. The type of adhesive is determined by the substrate. Typical adhesives used in practicing the method of the invention are polyethylene, ethyl vinyl acetate (EVA), or a combination of both.

The structure shown in FIG. 3 includes not only the roll 40 of hologram film material 42 but also: a pair of electrical corona treatment rollers 44 and 46 which straddle the web 48 of film material 42 as it comes off the roll 40 and which help adhesion of adhesive to the web 48 of hologram film material 42; a primer or sizing station 50 including a roller 52 which is downstream from the rollers 44 and 46 and engages one surface 54 of the web 48 of hologram film material 44 to apply a liquid primer to the hologram side of the hologram film to help adhesive adhere to metalized hologram film; a melted adhesive applicator 56 which is downstream from the station 50 and which is a hot melt extruder that can be of the type sold by ER-WE-PA Maschinenfabrik GmbH of Dusseldorf, Federal Republic of Germany or by Egan Machinery Division, John Brown, Inc. of Somerville, N.J. that applies melted adhesive obtained by extruding resin pellets to the hologram side 58, e.g., the metallized side, of the hologram film 42; a dryer unit 60 which is optional and which is located downstream from the adhesive applicator 56; a single corona treatment roller 62 for top coating the surface 54 of a web 64 of coated film 42; and a take up roll 68 for taking up the dried hologram film material coated with adhesive.

The corona rollers 44 and 46 discharge electrical charges to the surface of the polyester sheet or film and electrically "roughen" the hologram side of the polyester film to enable a primer (FDA approved water based primer) to stick to the hologram side of the polyester film. The corona treatment roller 62 treats the other polyester side 54 of the hologram film.

According to the teachings of the present invention, the hologram film or film material 36 or 42 has an adhesive coating 34 of 1 to 4 mils placed thereon.

An example of a laminated hologram product manufactured by the process of the present invention included a 2 mil hologram film metalized plus 2 mils adhesive thermo laminated onto a substrate of 20 mils resulting in a finished laminated product 30 having a thickness between 24 and 24.5 mils. The cross-section of such a laminated product 30 is shown in FIG. 2B.

After the metalized web of hologram film 42 has been unrolled to apply a layer of thermo adhesive thereon and then rolled up. The roll 66 of web 64 of adhesive coated hologram film 42 is then ready for use in the heat activated dry film thermo lamination process of the present invention and can be slit into smaller rolls for shipping and for use in a laminator.

Figure 4A:
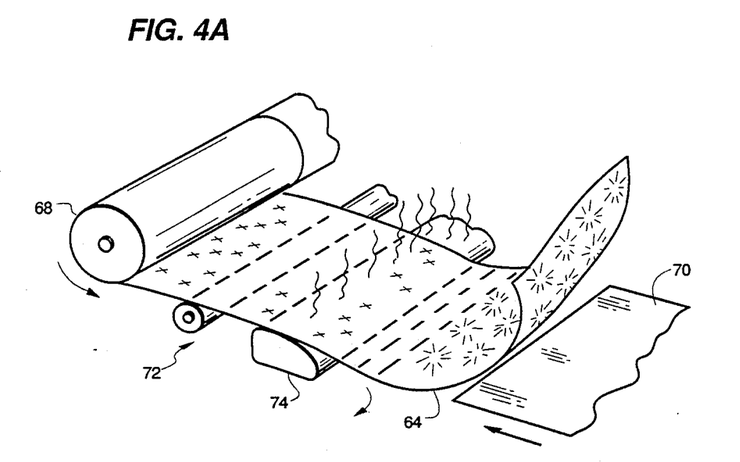
FIG. 4A is a fragmentary perspective view of a roll of hologram film treated material being fed past a heating shoe of the heat activated dry film thermo laminator and about to be folded over to engage and be laminated with a substrate.
Figure 4B:
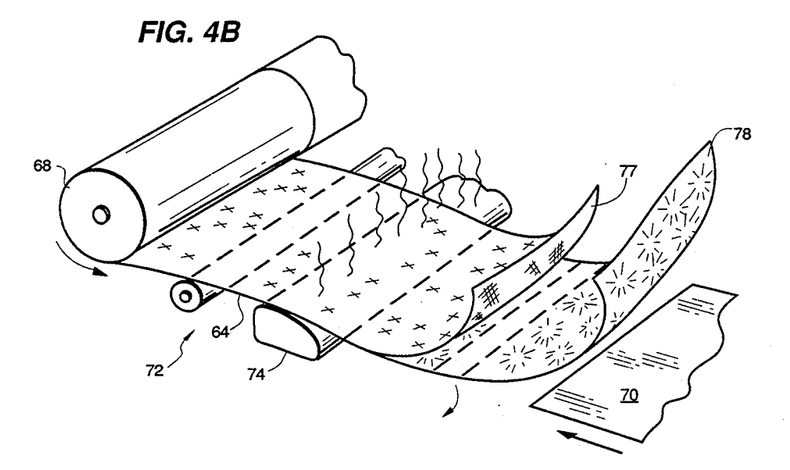
FIG. 4B is a modified perspective view of the roll of hologram film material shown in FIG. 4A and shows, for purposes of illustration only, a metallic layer of the film material on which adhesive had been applied peeled back from the film of hologram material.

The next step of the lamination process is shown in FIG. 4A or 4B.

After obtaining a roll 68 of hologram film material 42 having a thermoplastic adhesive applied to one side thereof, a substrate 70 (FIGS. 4A, 4B, 5 or 6) is selected, such as a thermoplastic substrate. Typical thermoplastic materials are: copolymer vinyl, homo polymer vinyl, styrene, Teslon ™, Kimdura ™, Lexan ™, Melanex ™, PETG, polyester, or other similar material. Also, if desired, the substrate can be a paper, wood or metal.

Without resorting to specially constructed machines, typical laminating machines can handle up to 60 mils of thickness of laminated product. This means that a substrate of up to 55 mils can be utilized in constructing the laminated product 10 or 30 of the present invention.

Figure 5:
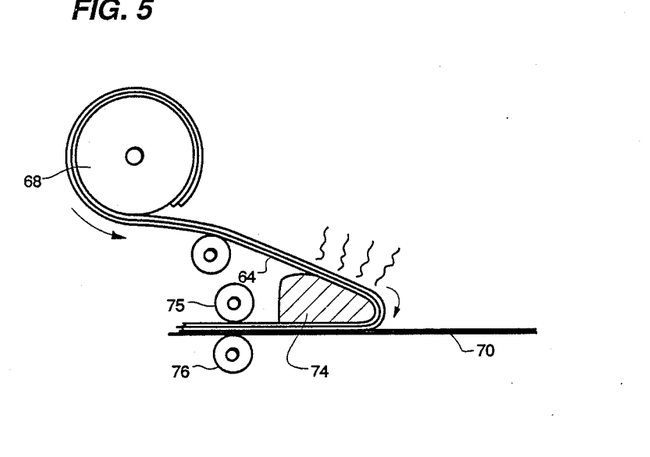
FIG. 5 is a side elevational view of the sheet of hologram film material as it is passed around the heating shoe of the heat activated dry film thermo laminator shown in FIG. 4A or 4B, engages the substrate for being laminated thereto and passes between the pressure rollers.

The web 64 of adhesive treated hologram film material and the substrate 70 shown in FIG. 5 are run through a heat activated dry film thermo laminator 72 which includes a heating shoe 74 and a pair of pressure rollers 75 and 76. The hologram film 42 coated with adhesive is passed over the heating shoe 74 and then fed beneath the heating shoe 74 and between the pressure rollers 75 and 76 simultaneously with the substrate 70 passes through pressure rollers and adhered thereto such that the thermoplastic adhesive layer (34 in FIG. 2B) is melted to adhere the film 42 of hologram material to the substrate 70.

FIG. 4B shows a layer 77 of metal with adhesive coating thereon peeled back from a hologram and polyester film layer 78.

Figure 6:
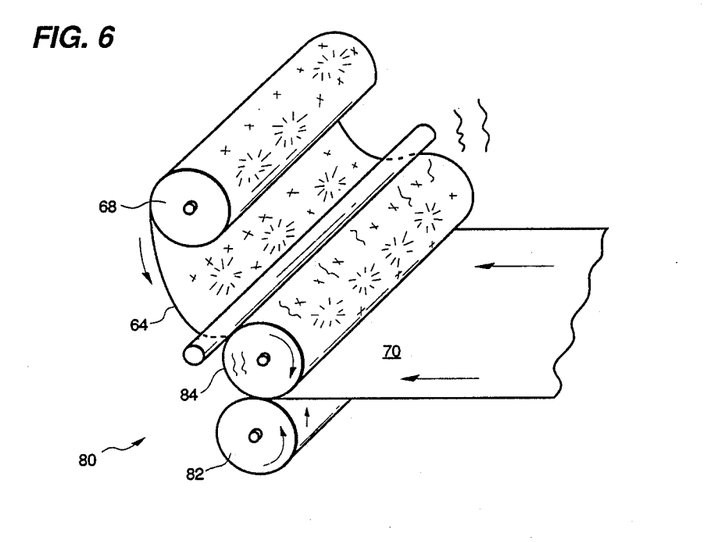
FIG. 6 is a fragmentary perspective view of another heat activated dry film thermo laminator for thermo laminating the sheet of hologram material from the roll thereof to a substrate in which the treated film of hologram material and substrate are passed between a pressure roller and a heat roller, as opposed to the heating shoe in the laminator shown in FIG. 5.

Different types of heat activated dry film thermo laminators can be used, such as the laminators made by D & K Custom Machine Design Inc. of Elk Grove Village, Ill., or made by General Binding Corporation of 1555 Mittel Boulevard, Suite Y, Wood Dale, Ill. 60191 with corporate offices at 1 GBC Plaza, Northbrook, Ill. 60062. A D & K type laminator 80 utilizing a pressure roller 82 and a heat roller 84 is illustrated in FIG. 6.

Depending on the substrate utilized, the feed rate and temperature will vary from 10 feet per minute to 60 feet per minute at temperatures between approximately 175 degrees and 300 degrees. An ideal temperature for laminating to a plastic substrate is between approximately 200 degrees and 275 degrees. The pressure applied in the laminator 72 or 80, such as by the pressure roller 82, is between approximately 30 psi and 100 psi which causes the substrate 70 to bond instantly to the hologram film 42.

As an alternative or modification, it is to be noted that the hologram adhesive coated film 42 can be thermo laminated to one side or to both sides of the substrate 70 using the method of the present invention.

Note also that the hologram side 58 of the web 64 of hologram film material 42 is coated with the thermoplastic adhesive. This is an important novel step of the method of the present invention. In this way, the hologram 12 mounted on, embedded in or embossed on a polyester film is adhered directly to the substrate 13, 32 or 70 whereby the hologram 12 is sandwiched between the polyester film substrate 22 of the hologram film 36 or 42 and the substrate 13 32 or 70 of the laminated product shown in FIGS. 2A and 2B.

In the thermo laminating process of the present invention, the flexible hologram film 36 or 42 which has been coated with the special thermoplastic adhesive such as polyethylene adhesive or ethyl vinyl acetate is run over a heating means such as the heating shoe 74 and between pressure rollers 75 and 76 shown in FIG. 5 or between the heat roller 84 and a pressure roller 82 of the laminator 80 shown in FIG. 6 which remelts the now dried adhesive and adheres the melted adhesive on the hologram film 36 or 42 to the substrate 16, 32 or 70 simultaneously thereby to form a heat activated dry film thermo laminate.

Figure 7:
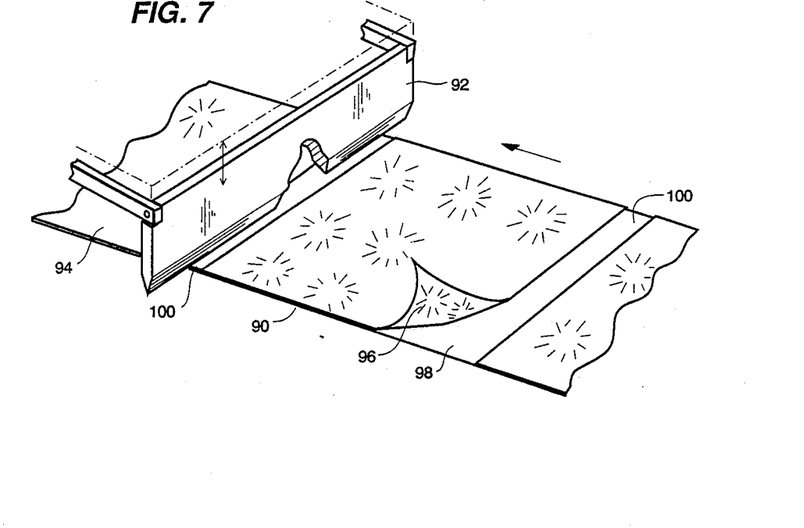
FIG. 7 is a fragmentary perspective view of a sheeter which is utilized for cutting sections of the web of laminated material coming from the laminator shown in FIG. 5 or from the laminator shown in FIG. 6.

A web or sheet 90 of laminated material or product coming from the laminator 72 or 80 can then be fed to a sheeter 92 where the web or sheet 90 of laminated material can be cut into sheets 94.

It is to be understood that the web or sheet 90 of hologram laminated product 10 can be fed to an automatic cutter or sheeter 92 for automatic cutting. Further, it is to be understood that the sheet or web 90 of laminated product 10 is sheeted to correct sheet sizes 94 which have been registered on each sheet 94 to correspond to the correct repeat position of the hologram film which had been specified to the hologram film manufacturer.

Then, after the sheets have been sheeted and squared, they can be cut further, converted or die cut to the desired finished product configuration.

With reference to FIGS. 4A, 4B, 6 and 7, it is to be noted that the roll 68 of hologram film 36 or 42 is typically made with sections 96 of hologram 12 fixed to a substrate 98 therefor (typically polyester) with the sections 96 of hologram 12 on the polyester film 98 being separated by non-hologram containing strips or sections 100 of substrate 98. This is clearly brought out in FIG. 7 where, for purposes of illustration only, a corner of a section 96 of hologram 1 is peeled back from the polyester film 98 on which it is carried and where the strips 100 of non-hologram containing polyester film 98 extending transversely of the web 90 of hologram film 36 or 12 is clearly shown.

Figure 11:
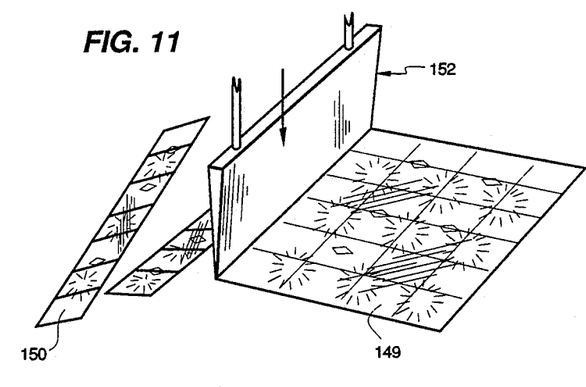
FIG. 11 is a fragmentary perspective view of a conventional guillotine cutter which can be utilized to cut the sheet or web of hologram laminated product into strips or sections of different size.

Preferably, the web 90 of hologram laminated product or material !0 or 30 coming from the laminator 72 o 80 is cured for approximately 24 hours before further processing, such as cutting with the guillotine cutters 152 shown in FIG. 11 or die cutting.

The hologram thermo laminated product 10 or 30 comprising the substrate 32, the adhesive 34, the hologram film 36 as shown in FIG. 2B, is now a finished product which can be utilized for various purposes including credit cards. However, for use as a credit card, typically further processing steps are carried out. In this respect, after the heat activated dry film thermo lamination process, top printing can be effected on a surface 102 of hologram film 36 or 12 laminated to the substrate 13 or 32.

Figure 8A:
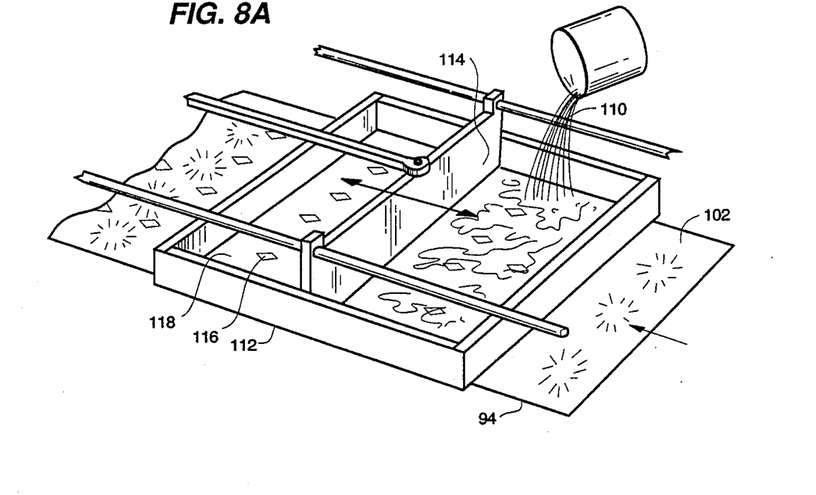
FIG. 8A is a fragmentary perspective view of a silk screen apparatus for printing on a sheet or web of hologram laminated product.

One printing process is shown in FIG. 8A and is a silk screen process where printing ink 110 is poured into a silk screen frame 112 and a wiper blade 114 presses the ink through specially designed openings 116 in a screen 118 to effect the printing of those designs 116 onto the sheet 94 of laminated product 10.

Figure 8B:
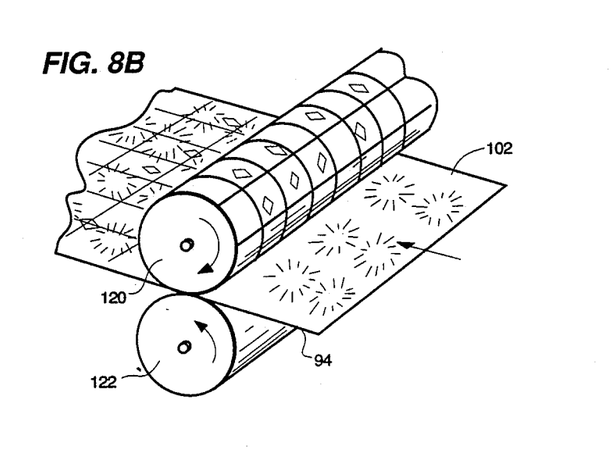
FIG. 8B is a fragmentary perspective view of a printing cylinder which can be utilized for printing on the sheet of hologram laminated product.

In FIG. 8B is illustrated an offset technique of printing onto the laminated product. Here the sheet 94 of laminated product 10 is passed between a printing roller 120 and a pressure roller 122.

Of course, it is to be understood that other printing techniques, such as letterpress, litho UV offset, rotogravure, or flexography can be utilized for printing on the sheet 94 or web 90 of laminated product !0.

Figure 9:
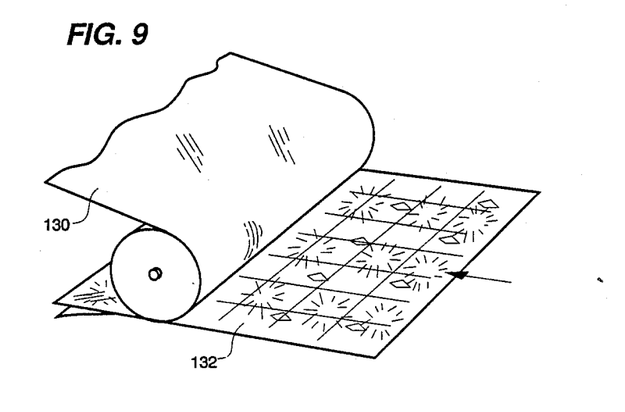
FIG. 9 is a fragmentary perspective view of an apparatus for applying a sheet of clear film which is thermo adhered to the printed hologram laminated product.

Additionally, if desired, and as best shown in FIG. 9, a clear film 130 of plastic material can be applied over a sheet or web 132 of the printed hologram laminated product 10 to provide a protective surface thereover.

Figure 10:
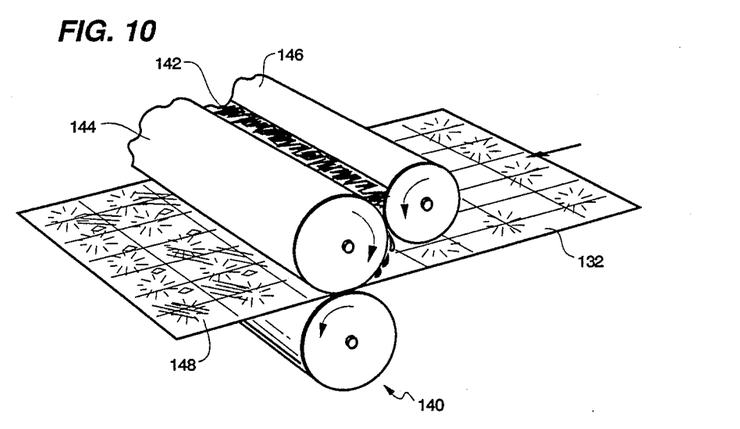
FIG. 10 is a fragmentary perspective view of a roller coater for coating the laminated hologram product with a clear liquid coating.

Such a protective surface can also be applied with a roller coater 140 where a clear liquid coating 142 is supplied between two rollers 144 and 146 to the sheet or web 132 of printed hologram laminated product 10, as shown in FIG. 10.

The clear liquid coating 142 can be a clear liquid UV coating or a conventional clear liquid coating which is applied over the surface printing on the sheet or web 132 of hologram laminated product 10 to provide protection for the printing in a resulting sheet or web 148.

The sheet or web 148 of finished product 10 is then cut into desired strips or sections 150 or various uniform sizes, as shown in FIG. 11, using a conventional guillotine cutter 152.

Figure 12:
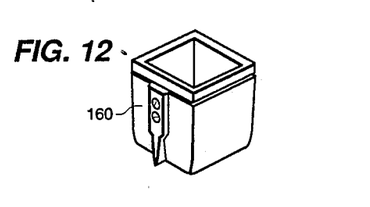
FIG. 12 is a perspective view of a PMC credit card type die used for finish cutting a laminated hologram product to the correct credit card size and specifications.

Then, when the method of the present invention is being utilized to manufacture credit cards, a standard PMC credit card type die 16 shown in FIG. 12 is utilized for converting finished cut hologram laminated product 10 to the correct card size and specifications. The lower end of the die 160 shown in FIG. 12 is beveled on four sides.

From the foregoing description, it will be apparent that the method or process of the present invention for heat activated dry film thermo laminating a hologram film to a substrate to create a hologram laminated product and the product formed thereby have a number of advantages, some of which have been described above and others of which are inherent in the invention. For example, the finished laminated product has a hologram 12 or 36 which extends the full or partial surface area 16 of the laminated product 10 whereby a credit card 10 can be manufactured with a hologram extending the full surface area 16 of the credit card 10. Also, it is to be noted that the hologram is on the adhesive side of the polyester film so that the hologram is sandwiched between the substrate and the polyester film side thereby fully isolating the hologram from the outer surface of the polyester film whereby the hologram is protected from abrasions to the top side surface or to the bottom side surface of the laminated product.

Also, it will be understood from the foregoing description that modifications can be made to the process and resulting laminated product 10 without departing from the teachings of the invention. Some of these modifications have been described above. Another modification is that the printing that is to be applied to a laminated product 10 can be printed on the hologram side of the hologram film before the thermoplastic adhesive coating is applied thereto and then the printed hologram film with thermoplastic adhesive thereon can be heat activated dry film thermo laminated to the substrate 13 or 32 to form the laminated product 10.

In view of the various modifications that can be employed in the method or process and product of the present invention, without departing from the teachings of the present invention, the scope of the invention is only to be limited as necessitated by the accompanying claims.

I claim:

1. A laminated hologram product including a stiff, but flexible substrate layer, a hologram layer and an intermediate thermoplastic adhesive layer which is initially applied as an extruded hot melt to one side of said hologram layer and then allowed to dry, said laminated hologram product being formed by feeding the hologram layer with the thermoplastic adhesive layer thereon together with the substrate layer through a heat activated dry film thermo laminator.

2. The hologram laminated product of claim 1 wherein said hologram film layer extends substantially throughout the entire surface area on one side of the laminated product.

3. The hologram laminated product of claim 1 wherein said hologram film layer includes a plastic film substrate having holograms therein or thereon.

4. The hologram laminated product of claim 3 wherein said hologram film layer has the hologram side of the film adhered to the substrate with the film substrate for the hologram film being on an outer face of the laminated product.

5. The hologram laminated product of claim 4 wherein said hologram film substrate outer face is a clear plastic material.

6. The hologram laminated product of claim 3 wherein said film substrate for said hologram film is polyester.

7. The hologram laminated product of claim 1 wherein said substrate is a plastic material.

8. The hologram laminated product of claim 1 wherein said substrate is between 10 and 60 mils in thickness.

9. The hologram laminated product of claim 1 wherein said hologram film is between approximately 1 and 4 mils thick and is initially formed with a thermoplastic adhesive coating of approximately 1 and 4 mils applied thereto prior to lamination to the substrate.

10. The hologram laminated product of claim 1 wherein said hologram film has printing thereon on the side of the film which faces and is adhered to the substrate.

11. The hologram laminated product of claim 1 including printed matter on at least one side thereof.

12. The hologram laminated product of claim 11 wherein said printing is on the hologram film outer surface of the laminated product.

13. The hologram laminated product of claim 1 wherein said hologram film is metalized before an adhesive coating is applied to the metalized surface of the film which is then heat activated dry film thermo laminated to the substrate.

14. The hologram laminated product of claim 1 wherein the hologram film surface of the laminated product has a protective layer fixed thereto.

15. The hologram laminated product of claim 14 wherein said protective layer is a thermo laminated sheet of clear plastic material that is laminated to the outer surface of the hologram film layer of the laminated product.

16. The hologram laminated product of claim 14 wherein said protective layer is a coating applied to the outer surface of the hologram film layer of the laminated product by a roller coater.

17. A method for creating a hologram film laminated product comprising the steps of: treating one side surface of a hologram film for enhancing the adherence of an adhesive material thereto; extruding a hot melt of thermoplastic adhesive material onto said one side surface of the hologram film and allowing the thermoplastic adhesive material to dry; feeding a substrate to a heat activated dry film thermo laminator; simultaneously feeding the hologram film with the thermoplastic adhesive coated side thereof facing the substrate into the laminator with the substrate; and thermo laminating the hologram film material to the substrate.

18. The method of claim 17 wherein said hologram film is coiled in a web of film on a roller and is fed from the roller to the laminator.

19. The method of claim 17 wherein said hologram film includes a plastic film substrate on which are mounted sections of hologram.

20. The method of claim 17 wherein said heat activated dry film thermo laminator includes a heating shoe and said hologram film is passed over said heating shoe and pressure rollers and then under said heating shoe through said pressure rollers simultaneously with the feeding of the substrate under the heating shoe and through said pressure rollers.

21. The method of claim 17 wherein said hologram film is fed over a heating roller in the laminator and then between the heating roller and a pressure roller as the substrate is fed simultaneously with the hologram film between the heating roller and the pressure roller.

22. The method of claim 17 wherein the thermoplastic adhesive includes polyethylene adhesive.

23. The method of claim 17 wherein the thermoplastic adhesive includes ethyl vinyl acetate.

24. The method of claim 17 wherein the temperature of the heat applied in the heat activated dry film thermo laminator is between approximately 175° and 300° F.

25. The method of claim 17 wherein the pressure applied to the hologram film and substrate in tho laminator is between approximately 30 psi and 100 psi.

26. The method of claim 17 wherein said hologram film and substrate are fed into the laminator at a feed rate of between approximately 10 feet per minute and 60 feet per minute.

27. The method of claim 17 including the step of curing the laminated product before further processing of same.

28. The method of claim 27 wherein said curing time is approximately 24 hours.

29. The method of claim 17 including the further step of applying printing to the web or sheet of laminated product exiting from the laminator.

30. The method of claim 29 wherein printing is applied to the outer surface of the hologram film layer of the laminated product.

31. The method of claim 29 wherein printing is first applied to the hologram side of the hologram film prior to the hologram film being coated with adhesive.

32. The method of claim 17 wherein the hologram film is metalized before a thermoplastic adhesive coating is applied thereto.

33. The method of claim 17 wherein the outer surface of the hologram film layer of the resulting web or sheet of laminated product is provided with a protective coating.

34. The method of claim 33 wherein said protective coating is a layer of clear plastic material which is heat activated dry film thermo laminated to the laminated product exiting the laminator.

35. The method of claim 33 wherein the protective layer is a clear liquid applied by a roller coater.

36. The method of claim 17 including the further step of cutting the web of hologram laminated product into sheets or sections.

37. The method of claim 36 including the further step of finish cutting products such as credit cards from the sheet or section of hologram laminated product.

38. The method of claim 17 wherein said step of treating the hologram surface of the hologram film comprises the step of feeding the hologram film between electric corona treatment rollers.

39. The method of claim 17 wherein said extruded melted adhesive is obtained from resin pellets.

40. The method of claim 17 wherein said step of allowing the adhesive to dry includes the further step of passing the hologram film over a dryer unit.

41. The method of claim 17 including the further step of treating the exposed hologram surface to enhance the ability of that surface to receive material thereon such as printing or a layer of plastic, said further step being carried out between the step of extruding melted thermoplastic adhesive onto one side of the hologram film layer and the step of feeding the substrate and hologram film with thermoplastic adhesive thereon into the thermo laminator.

42. The method of claim 38 including the additional step of passing the corona treated hologram film past a primer or sizing station prior t the extruding of melted thermoplastic adhesive thereon.

43. The method of claim 41 wherein said step of treating the exposed hologram surface of the hologram film after the adhesive layer has dried thereon includes the step of passing the hologram film with dried thermoplastic adhesive thereon past a corona treatment roller for treating the exposed hologram surface of the hologram film.

44. The method of claim 17 wherein said treating step is carried out after the hologram film is metalized.

45. A method for creating a hologram film laminated product comprising the steps of: treating one hologram surface of a hologram film for enhancing the adherence of an adhesive material thereto; extruding a hot melt of thermoplastic adhesive material onto said one surface of the hologram film and allowing the thermoplastic adhesive material to dry; treating the other exposed hologram surface of the hologram film for enhancing the ability of the exposed hologram surface to receive material thereon such as printing or a layer of plastic; feeding a substrate to a heat activated dry film thermo laminator; simultaneously feeding the hologram film with the thermoplastic adhesive coated side thereof facing the substrate into the laminator with the substrate; and thermo laminating the hologram film material to the substrate.

46. The method of claim 45 including the additional step of passing the treated hologram film past a primer or sizing station prior to the extruding of melted thermoplastic adhesive thereon.

47. The method of claim 45 wherein said step of allowing the adhesive layer to dry includes the step of passing the hologram film over a dryer unit.

48. The method of claim 45 wherein said first treating step is carried out after the hologram film is metalized.

49. A method for creating a hologram film laminated product comprising the steps of: treating one hologram surface of a hologram film for enhancing the adherence of an adhesive material thereto, said treating step being accomplished by passing the one surface of the hologram film past a corona treatment roller; extruding a hot melt of thermoplastic adhesive material onto said one surface of the hologram film and allowing the thermoplastic adhesive material to dry; treating the other exposed hologram surface of the hologram film layer for enhancing the ability of the exposed hologram surface to receive material thereon such as printing or a layer of plastic, said treating step being accomplished by passing the exposed surface of the hologram film past a corona treatment roller; feeding a substrate to a heat activated dry film thermo laminator; simultaneously feeding the hologram film with the thermoplastic adhesive coated side thereof facing the substrate into the laminator with the substrate; and thermo laminating the hologram film material to the substrate.

50. The method of claim 49 including the additional step of passing the treated hologram film past a primer or sizing station prior to the extruding of melted thermoplastic adhesive thereon.

51. The method of claim 49 wherein said step of allowing the adhesive layer to dry includes the step of passing the hologram film over a dryer unit.

52. The method of claim 49 wherein said first treating step is carried out after the hologram film is metalized.

* * * * *